June 10, 1969 M. J. WRIGHT 3,449,598

TRANSISTOR CIRCUITS

Filed Oct. 4, 1965

3,449,598
TRANSISTOR CIRCUITS

Maurice James Wright, Harborne, Birmingham, England, assignor to Joseph Lucas (Industries) Limited, Birmingham, England, a British company Filed Oct. 4, 1965, Ser. No. 492,430
Claims priority, application Great Britain, Oct. 14, 1964, 41,863/64
Int. Cl. H03k *1/12*
U.S. Cl. 307—202 2 Claims

ABSTRACT OF THE DISCLOSURE

In a transistor circuit the load is connected in the collector circuit of a main transistor, and pulses are applied to the base of the transistor from time to time so that the main transistor conducts. At the same time as the main transistor conducts, a capacitor starts to charge, and in the event that the impedance of the load is below a predetermined value, then the capacitor charges sufficiently to break down a Zener diode or other voltage sensitive device, which in turn causes conduction of a switch, for example a transistor, for short-circuiting the base-emitter of the main transistor.

This invention relates to transistor circuits.

A transistor circuit according to the invention comprises in combination a transistor, means for periodically applying pulses to the base of the transistor to cause it to conduct, and means sensitive to the collector-emitter voltage of the transistor for switching the transistor off when the collector-emitter voltage exceeds a predetermined value.

In use, the circuit specified in the preceding paragraph has a load in the collector-emitter circuit of the transistor. The transistor saturates for normal values of load impedance, and remains conductive while a pulse is applied to its base. However, if the load impedance is below a predetermined level, the transistor collector-emitter voltage rises to a value to cause the transistor to be switched off.

Figure 1:
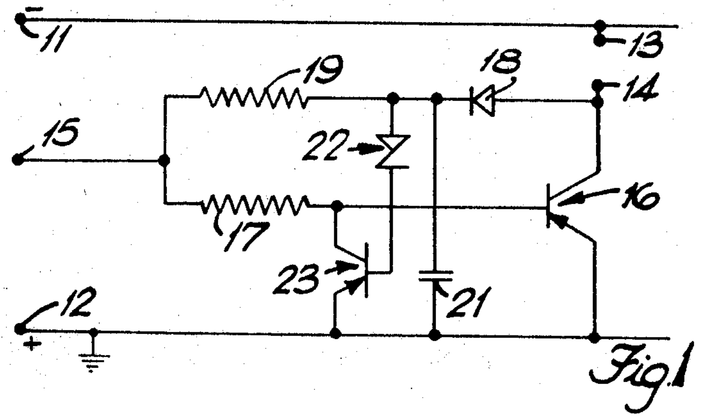
Figure 2:
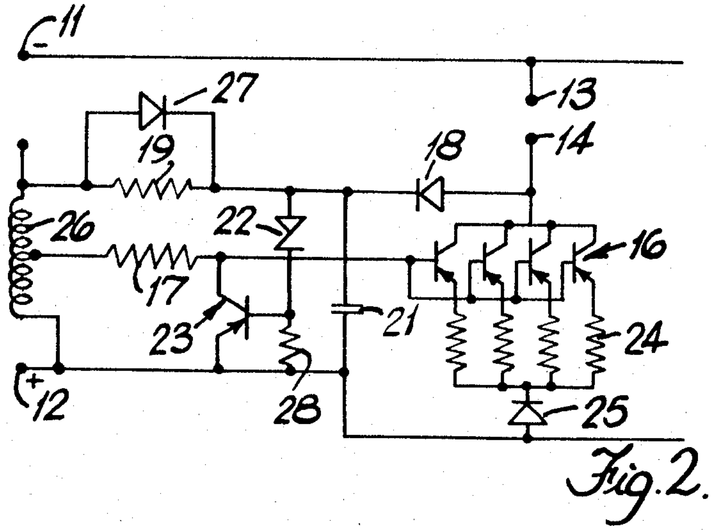

In the accompanying drawings, FIGURE 1 is a circuit diagram illustrating one example of the invention, and FIGURE 2 illustrates a number of modifications of FIGURE 1.

Referring to FIGURE 1, there are provided first and second terminals 11, 12 which in use are connected to a D.C. source so as to be negative and positive in polarity respectively, third and fourth terminals 13, 14 between which a load is connected in use, and a fifth terminal 15 connected in use to a source of negative pulses. The terminals 11, 13 are interconnected, and the terminal 14 is connected to the collector of a p-n-p transistor 16 having its emitter connected to the terminal 12 (which is preferably earthed), and its base connected through a resistor 17 to the terminal 15.

The collector of the transistor 16 is further connected to the anode of a diode 18 having its cathode connected through a resistor 19 to the terminal 15, the cathode being further connected through a capacitor 21 to the terminal 12 and through a Zener diode 22 to the base of a second p-n-p transistor 23. The transistor 23 has its emitter connected to the terminal 12 and its collector connected to the terminal 15 through the resistor 17.

In operation, when a pulse appears at the terminal 15, the capacitor 21 commences to charge and the transistor 16 is rendered conductive. Provided the impedance of the load is above a predetermined value, the transistor 16 will be saturated and the potential at its collector will be close to earth potential. In these circumstances, the diode 18 can conduct, and the voltage developed across the capacitor 21 is limited to a value less than the breakdown voltage of the Zener diode 22. The transistor 16 conducts until the pulse is removed, at which point the circuit reverts to its original stage, the capacitor 21 discharging through the resistor 19 and the pulse source.

In the event of the load being short-circuited or having an impedance below the predetermined value, when the transistor 16 is rendered conductive it will not saturate, and its collector-emitter voltage will be sufficiently great to reverse bias the diode 18. The capacitor 21 now continues to charge and breaks down the Zener diode 22, so that the transistor 23 conducts. The flow of current through the collector and emitter of the transistor 23 removes the base current from the transistor 16, which is switched off and remains off until the pulse is removed from the terminal 15 and a new cycle is commenced on receipt of a further pulse.

It will be appreciated that if the value of the load impedance falls while the transistor 16 is saturated, the transistor 16 will still be switched off as explained above.

In the circuit described, the capacitor 21 provides a short delay while the current in the load circuit builds up, so that the circuit in effect senses whether or not the transistor 16 is to be allowed to conduct or not. This delay can be reduced if necessary by including an inductor between the collector of the transistor 16 and the terminal 14.

The arrangement described above can equally be applied to a circuit in which the first transistor forms part of a more complex network having three terminals which are connected in the circuit in the same way as the collector, emitter and base of the first transistor in the example described.

FIGURE 2 shows a number of minor modifications of FIGURE 1. The transistor 16 is replaced by a plurality of transistors 16 all of which are protected by the same circuit. The transistors 16 are provided with individual emitter resistors 24 for equalising current flows through the transistors, and a common emitter diode 25 for ensuring that the transistors 16 are off between pulses. The pulses in this case are applied to the primary winding of a transformer having a secondary winding 26 one end of which is connected to the terminal 12. The resistor 19 is connected to the other end of the winding 26, but the resistor 17 is connected to an intermediate point on the winding 26, so that a higher voltage is available for charging the capacitor 21 than for switching the transistors 16 on. Moreover, the resistor 19 is bridged by a diode 27 which decreases the discharge time of the capacitor 21, and the base of the transistor 23 is connected through a resistor 28 to the terminal 12.

A particular use for the circuits described is in conjunction with railway track signalling equipment, where the terminals 13, 14 are connected to a pair of rails in a section. When no train is in the section, the load resistance is high, so that the collector-emitter current is small and the transistor or transistors 16 saturate for the base current which is supplied. When a train is in the section, the rails are short-circuited and the load resistance falls sharply with consequential rise in collector-emitter current. As the base current is fixed, the transistor or transistors fail to saturate and are switched off as explained. Typically, the transistors 16 in FIGURE 2 dissipate 50 to 100 watts, with no train in the section, for the duration of each pulse. When a train is in the section, the dissipation is of the order of 1000 watts, but only for a small portion of each pulse period.

Having thus described my invention what I claim as new and desire to secure by Letters Patent is:

1. A transistor circuit comprising in combination first and second supply lines, a transistor, means coupling the collector of said transistor to said first supply line through a load, means coupling the emitter of said transistor to said second supply line, a diode and a capacitor connected in series between the collector of said transistor and said second supply line, a supply terminal to which pulses are applied periodically, means coupling said supply terminal to the junction of said diode and said capacitor, and also to the base of said transistor, voltage sensitive means connected in a circuit across said capacitor, said voltage sensitive means conducting when the voltage across said capacitor reaches a predetermined value, and switch means connected across the base-emitter of said transistor, said switch means being controlled by said voltage sensitive means, and said capacitor charging sufficiently to turn on said voltage sensitive device only if the impedance of said load is below a predetermined value.

2. A circuit as claimed in claim 1 in which said switch means is a second transistor having its collector connected to the base of the first mentioned transistor and its emitter connected to said second supply line, said voltage sensitive means being constituted by a Zener diode connected between the junction of said diode and said capacitor and the base of said second transistor.

References Cited

UNITED STATES PATENTS

| | | | |
|---|---|---|---|
| 2,832,900 | 4/1958 | Ford | 317—33 |
| 2,915,693 | 12/1959 | Harrison | 317—31 |
| 2,932,783 | 4/1960 | Mohler | 307—297 |
| 3,058,034 | 10/1962 | Sandin | 317—33 |
| 3,074,006 | 1/1963 | Klees | 317—33 |
| 3,176,163 | 3/1965 | Tiemann | 317—33 |
| 3,237,082 | 2/1966 | Heller | 307—297 |
| 3,303,387 | 2/1967 | Springer | 307—202 |
| 3,327,201 | 6/1967 | Brantley | 307—297 |

ARTHUR GAUSS, *Primary Examiner.*

H. DIXON, *Assistant Examiner.*

U.S. Cl. X.R.

307—297; 317—31